(12) United States Patent
Keller

(10) Patent No.: US 12,145,667 B2
(45) Date of Patent: Nov. 19, 2024

(54) STEERING METHOD FOR AN INDUSTRIAL TRUCK, AND INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

(*) Notice: Subject to any disclaimer, the term of this patent is extended or adjusted under 35 U.S.C. 154(b) by 403 days.

(21) Appl. No.: 17/600,109

(22) PCT Filed: Dec. 18, 2019

(86) PCT No.: PCT/EP2019/085967
§ 371 (c)(1),
(2) Date: Sep. 30, 2021

(87) PCT Pub. No.: WO2020/200505
PCT Pub. Date: Oct. 8, 2020

(65) Prior Publication Data
US 2022/0161845 A1 May 26, 2022

(30) Foreign Application Priority Data
Apr. 2, 2019 (DE) ...................... 10 2019 108 589.6

(51) Int. Cl.
*B62D 5/093* (2006.01)
*B62D 5/12* (2006.01)
*B66F 9/075* (2006.01)

(52) U.S. Cl.
CPC ............... *B62D 5/093* (2013.01); *B62D 5/12* (2013.01); *B66F 9/07568* (2013.01)

(58) Field of Classification Search
CPC ........ B62D 5/093; B62D 5/12; B66F 9/07568
USPC ....................................... 280/47.11
See application file for complete search history.

(56) References Cited

U.S. PATENT DOCUMENTS

| | | | | |
|---|---|---|---|---|
| 2,661,672 A | * | 12/1953 | Fairbanks | F16M 11/42 280/47.11 |
| 2,950,121 A | * | 8/1960 | Fisher | B62D 7/026 188/29 |
| 3,087,564 A | * | 4/1963 | Quayle | B62D 7/02 180/411 |
| 3,134,455 A | * | 5/1964 | Fiorentini | B62D 7/026 180/236 |

(Continued)

FOREIGN PATENT DOCUMENTS

| | | |
|---|---|---|
| DE | 1 196 974 | 7/1965 |
| DE | 10 2008 047 621 A1 | 4/2010 |

(Continued)

*Primary Examiner* — Jeffrey J Restifo
(74) *Attorney, Agent, or Firm* — Norman B. Thot

(57) ABSTRACT

A steering method for an industrial truck. The industrial truck includes a pivot plate which is mounted to be rotatable about a steering axis in two steering directions, three wheels, one of the three wheels being designed as a central wheel which is rotatably mounted about an axis of rotation in the pivot plate, and a hydraulic cylinder which rotates the pivot plate about the steering axis. The method includes exerting steering forces of at least approximately equal magnitude on the pivot plate to provide a rotation about the steering axis in each of the two steering directions.

8 Claims, 4 Drawing Sheets

(56) References Cited

U.S. PATENT DOCUMENTS

| | | | | |
|---|---|---|---|---|
| 3,601,422 | A * | 8/1971 | Woods | B66F 9/07568 180/411 |
| 3,696,881 | A * | 10/1972 | Gordon | B62D 5/09 60/471 |
| 3,752,248 | A * | 8/1973 | Stevens | B62D 5/12 91/368 |
| 3,998,288 | A * | 12/1976 | Aoki | B62D 7/06 180/211 |
| 4,047,729 | A * | 9/1977 | Smith | B62K 5/08 482/77 |
| 4,095,250 | A * | 6/1978 | Giglioli | F16M 11/42 280/47.11 |
| 4,852,679 | A * | 8/1989 | Fry | G05G 9/047 280/47.11 |
| 4,934,726 | A * | 6/1990 | Daenens | B62D 13/04 280/47.11 |
| 4,950,126 | A * | 8/1990 | Fabiano | B66F 11/048 280/47.11 |
| 5,174,593 | A * | 12/1992 | Chapman | F16M 11/42 280/47.11 |
| 5,312,121 | A * | 5/1994 | Chapman | B66F 11/048 280/47.11 |
| 5,318,313 | A * | 6/1994 | Chapman | F16F 9/12 280/47.11 |
| 5,490,684 | A * | 2/1996 | Chapman | B66F 11/048 280/47.11 |
| 5,492,353 | A * | 2/1996 | Chapman | B66F 11/048 280/47.11 |
| 5,716,062 | A * | 2/1998 | Lindsay | F16M 11/18 280/47.11 |
| 5,730,450 | A * | 3/1998 | Chapman | F16M 11/42 280/47.11 |
| 6,050,575 | A * | 4/2000 | Lindsay | F16M 11/28 280/47.11 |
| 6,109,626 | A * | 8/2000 | Chapman | B66F 11/048 280/47.11 |
| 6,557,658 | B1 * | 5/2003 | Enmeiji | B62D 7/1509 180/234 |
| 6,572,059 | B1 * | 6/2003 | Chapman | F16M 11/28 280/47.11 |
| 7,252,299 | B2 * | 8/2007 | Wierzba | B66C 9/04 212/270 |
| 7,611,293 | B2 * | 11/2009 | Lee | F16M 11/42 280/47.11 |
| 8,430,412 | B2 * | 4/2013 | Sanvido | B62D 13/04 280/47.11 |
| 8,930,082 | B2 * | 1/2015 | Keller | B62D 5/092 180/408 |
| 9,352,773 | B2 * | 5/2016 | Keller | B62D 7/026 |
| 9,776,846 | B2 * | 10/2017 | Ditty | B66F 9/07559 |
| 9,789,902 | B1 * | 10/2017 | Cui | B62D 7/1545 |
| 11,130,519 | B1 * | 9/2021 | Cui | B66F 9/07568 |
| 2002/0100643 | A1 * | 8/2002 | De Leeuw | B66F 9/07568 187/222 |
| 2003/0155163 | A1 * | 8/2003 | Sugata | B66F 9/07568 180/199 |
| 2004/0007414 | A1 * | 1/2004 | Sugata | B62D 7/026 180/411 |
| 2004/0007415 | A1 * | 1/2004 | Kouyama | B66F 9/07568 180/411 |
| 2005/0061570 | A1 * | 3/2005 | McVicar | B62D 7/026 180/308 |
| 2005/0133294 | A1 * | 6/2005 | Jung | B62D 5/12 180/414 |
| 2006/0213698 | A1 * | 9/2006 | Gaetani | B66F 9/07568 180/6.3 |
| 2007/0251746 | A1 * | 11/2007 | Noyer | B66F 9/07568 180/211 |
| 2007/0289798 | A1 * | 12/2007 | Kaufmann | B66F 9/10 180/411 |
| 2008/0277890 | A1 * | 11/2008 | Boster, II | B66F 9/07568 187/222 |
| 2009/0200097 | A1 * | 8/2009 | Farber | B66F 9/10 180/443 |
| 2010/0230201 | A1 * | 9/2010 | McVicar | B66F 9/07568 180/308 |
| 2013/0030656 | A1 * | 1/2013 | Keller | B62D 5/092 701/42 |
| 2015/0083516 | A1 * | 3/2015 | Keller | B62D 7/1509 180/403 |
| 2015/0175181 | A1 * | 6/2015 | Chapman | B62B 3/001 280/47.11 |
| 2016/0272474 | A1 * | 9/2016 | Keller | B62D 7/08 |
| 2016/0376134 | A1 * | 12/2016 | Xiaoxian | B62D 5/02 180/216 |
| 2017/0066636 | A1 * | 3/2017 | Xiaoxian | B62D 5/001 |
| 2019/0283582 | A1 * | 9/2019 | Keller | B62D 15/021 |
| 2020/0072255 | A1 * | 3/2020 | Dueckinghaus | A01D 43/08 |
| 2020/0393839 | A1 * | 12/2020 | Hasegawa | G05D 1/0274 |
| 2022/0048747 | A1 * | 2/2022 | Li | H04W 4/80 |
| 2022/0161845 | A1 * | 5/2022 | Keller | B66F 9/07568 |

FOREIGN PATENT DOCUMENTS

| | | |
|---|---|---|
| DE | 10 2012 110 988 A1 | 5/2014 |
| DE | 10 2013 105 820 A1 | 11/2014 |
| DE | 10 2016 113 260 A1 | 1/2018 |
| JP | S59-20773 A | 2/1984 |
| WO | WO 2005/009826 A1 | 2/2005 |

* cited by examiner

STEERING METHOD FOR AN INDUSTRIAL TRUCK, AND INDUSTRIAL TRUCK

CROSS REFERENCE TO PRIOR APPLICATIONS

This application is a U.S. National Phase application under 35 U.S.C. § 371 of International Application No. PCT/EP2019/085967, filed on Dec. 18, 2019 and which claims benefit to German Patent Application No. 10 2019 108 589.6, filed on Apr. 2, 2019. The International Application was published in German on Oct. 8, 2020 as WO 2020/200505 A1 under PCT Article 21(2).

FIELD

The present invention relates to a steering method for an industrial truck with three wheels, where one wheel is designed as a central wheel and is rotatably mounted about an axis of rotation in a pivot plate that is mounted so as to be rotatable about a steering axis in two steering directions, the pivot plate being rotated about the steering axis via a hydraulic cylinder. The present invention also relates to an industrial truck with three wheels, where one wheel is designed as a central wheel and is rotatably mounted about an axis of rotation in a pivot plate that is mounted so as to be rotatable about a steering axis in two steering directions, with a steering device for rotating the pivot plate about the steering axis.

BACKGROUND

Such a steering method and such an industrial truck have previously been described in DE 10 2012 110 988 A1.

The disadvantage here is that the central wheel can rotate about the steering axis at different speeds during steering depending on the direction in which the steering is carried out.

SUMMARY

An aspect of the present invention is to provide a steering method and an industrial truck which improve on this disadvantage.

In an embodiment, the present invention provides a steering method for an industrial truck. The industrial truck includes a pivot plate which is mounted so as to be rotatable about a steering axis in two steering directions, three wheels, one of the three wheels being designed as a central wheel which is rotatably mounted about an axis of rotation in the pivot plate, and a hydraulic cylinder which rotates the pivot plate about the steering axis. The method includes exerting steering forces of at least approximately equal magnitude on the pivot plate so as to provide a rotation about the steering axis in each of the two steering directions.

In an embodiment, the present invention also provides an industrial truck which includes a pivot plate which is mounted so as to be rotatable about a steering axis in two steering directions, three wheels, one of the three wheels being designed as a central wheel which is rotatably mounted about an axis of rotation in the pivot plate, and a steering device which is configured to rotate the pivot plate about the steering axis. The steering device includes a hydraulic circuit which comprises a hydraulic cylinder which is designed as a synchronous cylinder, the synchronous cylinder comprising an active piston rod and a passive piston rod, and a piston comprising a first piston side and a second piston side. The hydraulic circuit is designed so that a hydraulic medium of a same pressure and a same volume flow is applied either to the first piston side or to the second piston side of the piston

BRIEF DESCRIPTION OF THE DRAWINGS

The present invention is described in greater detail below on the basis of embodiments and of the drawings in which.

DETAILED DESCRIPTION

Figure 1:
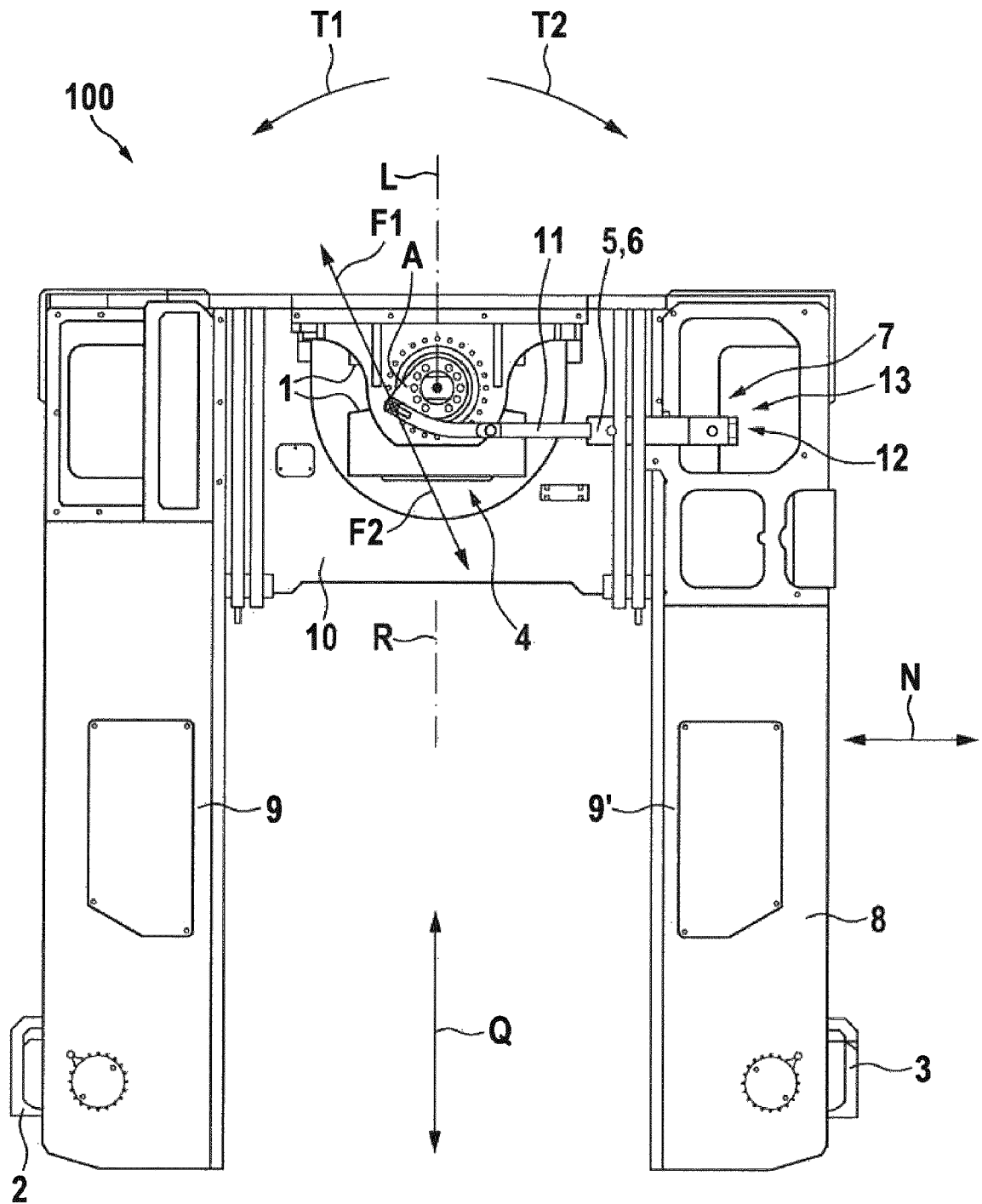
FIG. 1 is a view from above of an industrial truck according to the present invention in which some parts, such as the driver's cab, are omitted for the sake of simplicity.

In the steering method according to the present invention, steering forces of at least approximately equal magnitude are exerted on the pivot plate for rotation about the steering axis in both steering directions. This can, for example, apply under otherwise identical conditions, such as the same and/or identical driving speed and/or the same steering speed and/or starting from the same rotational position of the pivot plate about the steering axis and/or level ground. This makes it possible to achieve harmonious steering behavior regardless of the steering direction. The steering behavior can, for example, be the same for the driver regardless of the steering direction. The central wheel can rotate at the same speed in both steering directions during a steering process. A prerequisite is thereby created for the steering to work equally in both directions and not faster in one direction than in the other. The rotations of the steering wheel can thereby also be at least approximately the same with the same change in angle regardless of the steering direction.

The forces which are exerted on the pivot plate for rotation about the steering axis can, for example, differ by less than 10% or by less than 5%, depending on the direction in which the steering is carried out, under otherwise identical conditions.

The truck is three-wheeled, so it has exactly three wheels. The wheels can be designed as single or twin tires.

The pivot plate can, for example, be rotated about the steering axis via a hydraulic cylinder which is designed as a synchronous cylinder.

The synchronous cylinder can, for example, have a piston with a first piston side and a second piston side. The two sides of the piston can, for example, be the same size. The synchronous cylinder can, for example, be double-acting so that a hydraulic medium can be applied to the piston thereof from both sides. A hydraulic medium of the same pressure and the same volume flow can, for example, be applied either to the first piston side or the second piston side of the synchronous cylinder. The synchronous cylinder can, for example, have exactly one active piston rod which is used to transmit the translational movement of the piston. The synchronous cylinder can also, for example, have a passive piston rod which is not used to transmit a translational movement. The passive piston rod can, for example, be exclusively to achieve synchronization of the synchronous cylinder. The synchronous cylinder can, for example, have two openings, through each of which a piston rod protrudes from the inside of the cylinder to the outside. Both openings can, for example, be sealed off from the relevant piston rod via a piston rod seal. The synchronous cylinder can, for example, have a uniform inner diameter over at least almost its entire length. The two piston rods of the synchronous cylinder can, for example, have the same diameter in the region in which they come into contact with the piston rod seal.

The industrial truck can, for example, have a chassis and the synchronous cylinder can, for example, have a housing which is fixed to the chassis.

The active piston rod can, for example, not interact directly with the pivot plate, but rather via a steering lever. This can, for example, be mounted at one end on the active piston rod and at the other end on the pivot plate, for example, so as to be rotatable in each case. The pivot plate can, for example, have a steering arm to which the steering lever is fastened. The steering arm can, for example, be arranged on the pivot plate in a rotationally fixed manner.

The pivot plate can thereby be rotated about the steering axis through large steering angles. The steering angle can be up to 100° or 120° or 130° or 140° or 150°.

The piston sides of the synchronous cylinder can, for example, be acted upon by a hydraulic circuit in which no further hydraulic cylinders are integrated. The synchronous cylinder can, for example, therefore not coupled to a further hydraulic cylinder. Only the central wheel can, for example, be steered via the synchronous cylinder, and no further wheel.

The pivot plate can, for example, be rotated about a vertical steering axis.

The industrial truck according to the present invention disclosed has a steering device which comprises a hydraulic cylinder which is designed as a synchronous cylinder having an active and a passive piston rod. The industrial truck can, for example, be suitable for being steered using the steering method according to the present invention, for example, at least in transverse travel, i.e., in a direction parallel to the wheel arms of the chassis. The synchronous cylinder has a piston with a first side and a second side. The synchronous cylinder is double-acting, so that a hydraulic medium can be applied to the piston thereof from both sides. A hydraulic circuit is provided which is designed so that a hydraulic medium of the same pressure and the same volume flow is applied to either the first piston side or the second piston side.

This means that the steering functions equally in both directions since the forces that are applied to the pivot plate for steering can be at least approximately the same in both directions under otherwise identical conditions. The rotations of the steering wheel can also be approximately the same with the same change in angle regardless of the steering direction.

The truck is three-wheeled, so it has exactly three wheels. The industrial truck can be a forklift. The wheels can be designed as single or twin tires.

The synchronous cylinder can, for example, have exactly one active piston rod which is used to transmit the translational movement of the piston. The synchronous cylinder can also, for example, have a passive piston rod which is not used to transmit a translational movement. The passive piston rod can, for example, be used exclusively to achieve synchronization of the synchronous cylinder. The synchronous cylinder can, for example, have two openings, through each of which a piston rod protrudes from the inside of the cylinder to the outside. Both openings can, for example, be sealed off from the relevant piston rod via a piston rod seal. The synchronous cylinder can, for example, have a uniform inner diameter over at least almost its entire length. The two piston rods of the synchronous cylinder can, for example, have the same diameter in the region in which they come into contact with the piston rod seal.

The industrial truck can, for example, have a chassis and the synchronous cylinder can, for example, have a housing which is fixed to the chassis.

The steering device can, for example, comprise a steering lever which connects the active piston rod to the pivot plate. The steering lever can, for example, be rotatably fastened at one end to the active piston rod and at the other end to the pivot plate.

A large steering angle can thereby be possible. The steering angle can be up to 100° or 120° or 130° or 140° or 150°. In order to achieve large steering angles, the pivot plate can have a recess into which the steering lever enters only in certain steering situations. The pivot plate can have a fastening leg on which the wheel is rotatably mounted about an axis of rotation, and the recess can be arranged in this fastening leg.

The steering device can, for example, have has a hydraulic circuit which, apart from the synchronous cylinder, contains no other hydraulic cylinder. The synchronous cylinder can thus, for example, not be hydraulically coupled to a further hydraulic cylinder. The synchronous cylinder can, for example, not be hydraulically coupled to a further hydraulic motor.

The industrial truck can have a "U-shaped" chassis with two wheel arms that extend in parallel with one another and are interconnected at one end by a connecting region.

One wheel can be arranged in the region of the free end of each wheel arm. The central wheel can be arranged on the connecting region at least approximately centrally between the wheel arms.

All wheels of the industrial truck can be steered, for example, in two steering directions. The steering axis can, for example, be vertical.

The industrial truck can have a load capacity, for example, of up to 20 metric tons, for example, of approximately 14 metric tons.

In a further aspect, the present invention also relates to an industrial truck with at least three wheels, where at least one wheel is rotatably mounted about an axis of rotation in a pivot plate that is mounted so as to be rotatable about a steering axis, with a steering device for rotating the pivot plate about the steering axis, the steering device comprising a hydraulic cylinder which is designed as a synchronous cylinder with an active piston rod and a passive piston rod, and the industrial truck having a chassis and the synchronous cylinder having a housing that is fixed to the chassis, and the steering device comprising a steering lever which connects the active piston rod to the pivot plate and is rotatably fastened at one end to the active piston rod and at the other end to the pivot plate, the pivot plate having a fastening leg on which the associated wheel is rotatably mounted.

An industrial truck according to this further aspect is already described in DE 10 2012 110 988 A1. The disadvantage here is that it is not possible to achieve desirably large steering angles, or further precautions are required to achieve a large steering angle, such as recesses in the fastening legs. An aspect of the present invention is also to provide an industrial truck which is improved with regard to this disadvantage.

In the industrial truck according to the further aspect, the steering lever is fastened to the pivot plate above the fastening leg. Large steering angles can thereby be achieved without further precautions having to be taken, such as recesses for the steering lever in the fastening leg. The fastening leg can, for example, extend vertically. The industrial truck can be suitable for being steered in transverse travel using the steering method according to the present invention.

The pivot plate can, for example, have a steering bearing for rotatable mounting on the chassis about the steering axis. This can be a roller bearing. The steering bearing can, for example, be arranged above the fastening leg. The steering lever can, for example, be fastened to the pivot plate between the fastening leg and the steering bearing or above the steering bearing.

The pivot plate can, for example, have a steering arm to which the steering lever is fastened. This steering arm can, for example, be arranged on the pivot plate above the fastening leg, for example, between the fastening leg and the steering bearing or above the steering bearing, for example, in a rotationally fixed manner.

The present invention will now be explained below on the basis of an exemplary embodiment as shown in the drawings.

FIG. 1 shows an embodiment of an industrial truck according to the present invention in a view from above. Some elements of the industrial truck, such as the driver's cab, have been omitted for the sake of simplicity.

Figure 2:
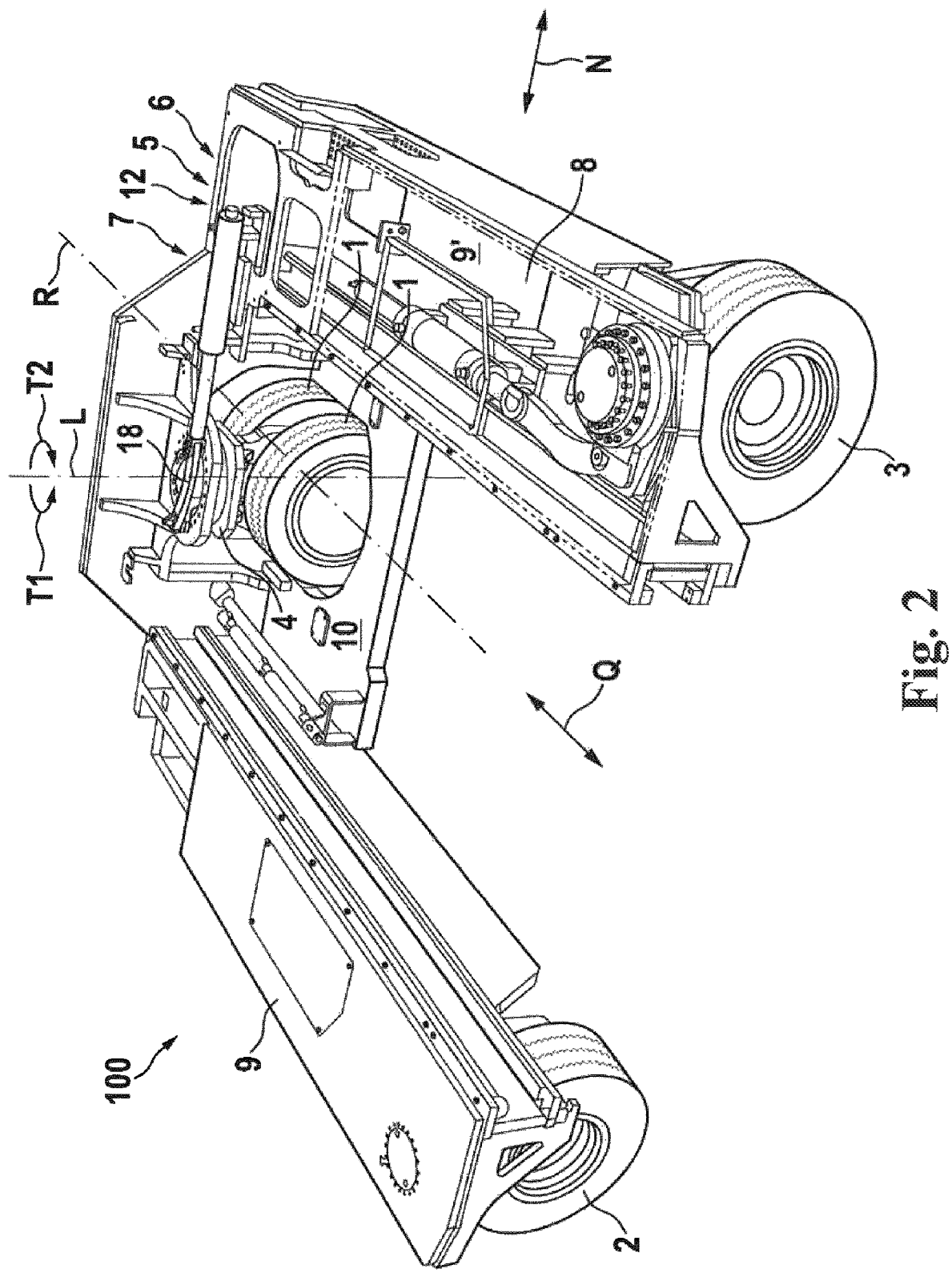
FIG. 2 shows the same truck in a perspective view.

FIGS. 1 and 2 show that the industrial truck 100 has three wheels 1, 2, 3, of which one wheel 1 is designed as a central wheel 1. The industrial truck 100 is therefore a three-wheeled industrial truck 100. The central wheel 1 comprises a twin tire. The industrial truck 100 has a "U-shaped chassis" 8 with two wheel arms 9, 9' which are interconnected by a connecting region 10. The central wheel 1 is arranged on the connecting region 10 centrally between the wheel arms 9, 9'.

All of the wheels 1, 2, 3 are steerable. The wheel positions of the industrial trucks 100, 200 shown in FIGS. 1, 2 and 4 correspond to longitudinal travel N. Cornering (not shown in the drawings) takes place in this case by steering the wheels 2, 102, 3, 103 of the wheel arms 9, 9'. In order to proceed from longitudinal travel N into transverse travel Q, in which cornering is steered by the central wheel 1, 101, the wheels are rotated by 90°.

The central wheel 1 is rotatably mounted about an axis of rotation R in a pivot plate 4. The pivot plate 4 is in turn mounted so as to be rotatable about a steering axis L in two steering directions T1, T2. The industrial truck 100 comprises a steering device 7 for rotating the pivot plate 4 about the steering axis L. The steering device 7 comprises the devices required for rotating the pivot plate 4, namely, a hydraulic cylinder 5 which is designed as a synchronous cylinder 6, with a steering lever 18 and a hydraulic circuit 15.

The industrial truck 100, 200 is steered in transverse travel, symbolized by the arrow Q, using a steering method in which steering forces F1, F2 of at least approximately equal magnitude are exerted on the pivot plate 4 to rotate the pivot plate 4 about the steering axis L in both steering directions T1, T2.

Figure 3:
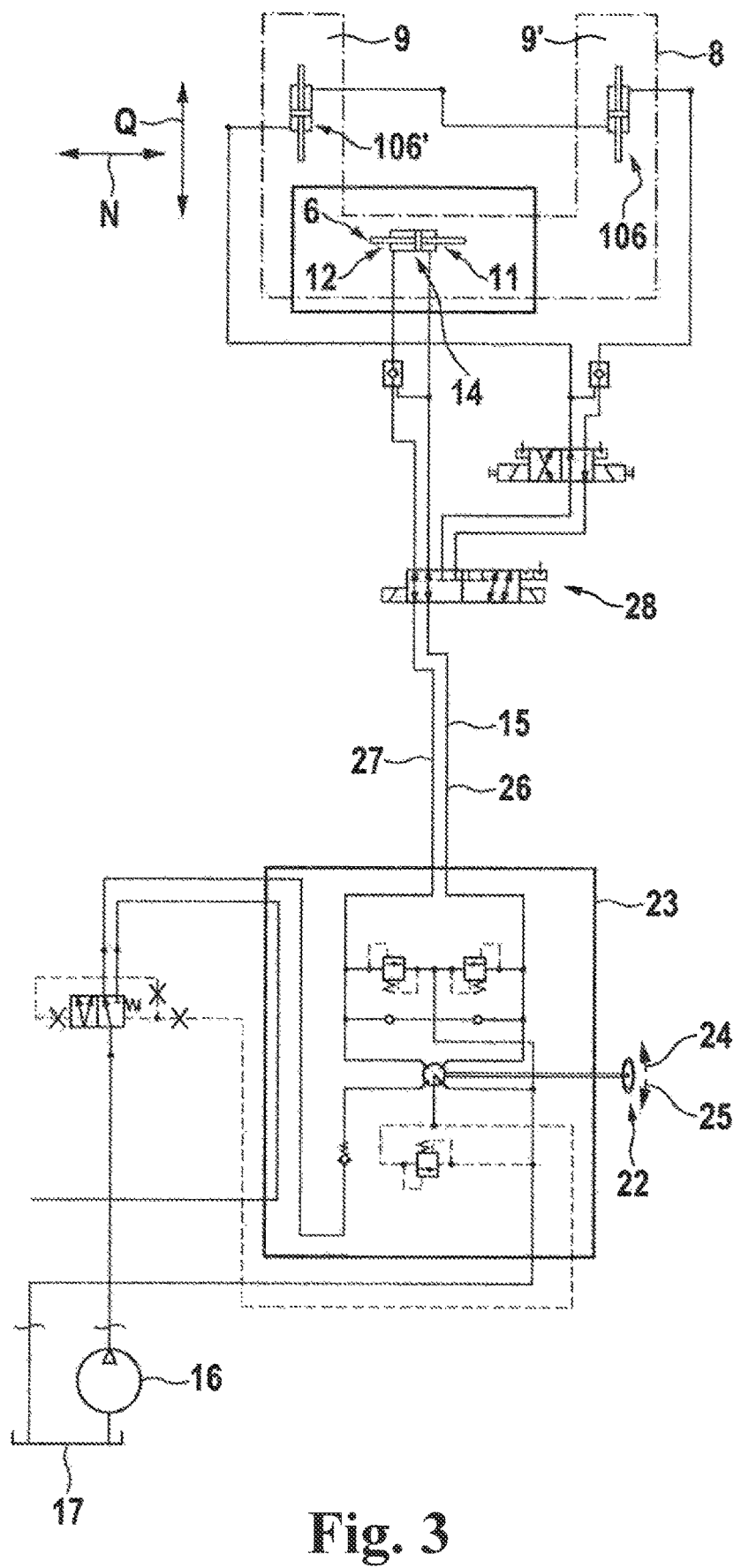
FIG. 3 is a simplified view of a section of a hydraulic circuit.

The hydraulic cylinder 5 is designed as a synchronous cylinder 6. It has an active piston rod 11 and a passive piston rod 12, which can best be seen in FIG. 3. The active piston rod 11 is used to transmit the translational movement of the piston 14. It is operatively connected to a steering lever 18 therefor. The passive piston rod 12 is not used to transmit the translational movement of the piston 14. Its free end is not connected. The pivot plate 4 has a steering arm A to which the steering lever 18 is fastened.

Both piston rods 11, 12 originate from different sides of the piston 14. The hydraulic circuit 15 of the steering device 7 is shown in detail in FIG. 3, which is explained below. In the shown embodiment, a steering actuation element 22 is designed as a steering wheel and is connected to a steering unit 23. The direction of rotation 24 or 25 in which the steering wheel is rotated determines whether the steering unit 23 connects either the hydraulic line 26, 27 leading to one side or the other of the piston 14 to the pump 16 or to the tank 17.

A valve 28 is shown in the switching position for the transverse travel Q. With the valve 28, instead of the synchronous cylinder 6 cooperating with the central wheel 1, the synchronous cylinders 106, 106' cooperating with the wheels 102, 103 arranged in the wheel arms 9, 9' can be connected to the pump 16 or to the tank 17 for steering during longitudinal travel N. The two wavy lines drawn above the tank 17 are thereby intended to make clear that further hydraulic components, which are not shown for the sake of simplicity, can here be arranged here.

Both sides of the piston 14 are the same size. The cylinder of the synchronous cylinder 6 has a uniform inner diameter over its entire length. The synchronous cylinder 6 has two openings, through each of which a piston rod 11, 12 protrudes from the inside of the synchronous cylinder 6 to the outside. Both openings are sealed off from the relevant piston rod 11, 12 via a piston rod seal. The active piston rod 11 and the passive piston rod 12 have the same diameter in the region in which they come into contact with the relevant piston rod seal, and the hydraulic circuit 15 is designed so that a hydraulic medium of the same pressure and the same volume flow is applied to either one piston side or the other piston side.

The synchronous cylinder 6 has a housing 13 which is fixed to the chassis 8. The steering lever 18 is rotatably mounted at one end on the active piston rod 11 and at the other end on the pivot plate 4.

Apart from the synchronous cylinder 6, no other hydraulic cylinder is integrated in the hydraulic circuit 15 which acts on the piston sides of the synchronous cylinder 6. The synchronous cylinder 6 is therefore not coupled to a further hydraulic cylinder. The valve 28 can be used to switch to another hydraulic circuit 15, which then no longer applies a hydraulic medium to the synchronous cylinder of the central wheel 1. Only the central wheel 1 is steered using the synchronous cylinder 6.

Figure 4:
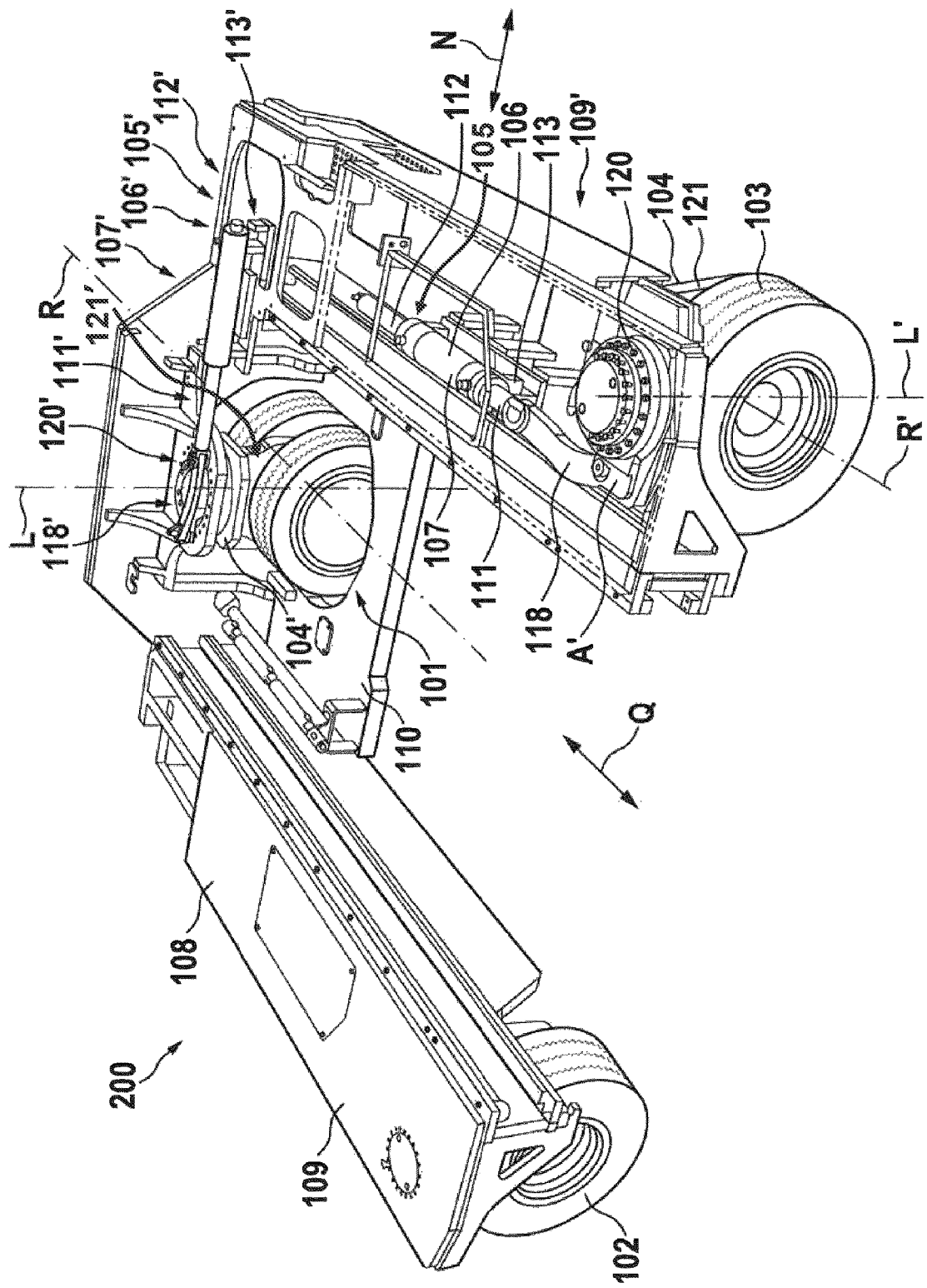
FIG. 4 is a view as in FIG. 2.

The features of an embodiment of industrial truck 200 will now be explained with reference to FIG. 4, which shows the same industrial truck as FIG. 2:

FIG. 4 shows that the industrial truck 200 has three wheels 101, 102, 103. Each wheel is rotatably mounted about an axis of rotation R, R' in a pivot plate 104, 104' which is mounted so as to be rotatable about a steering axis L, L'.

A steering device 107, 107' is provided for each steerable wheel in order to rotate the pivot plate about the steering axis L. Each such device comprises a hydraulic cylinder 105, 105' which is designed as a synchronous cylinder 106, 106' with an active piston rod 111, 111' and a passive piston rod 112, 112'. The industrial truck 200 has a chassis 108 and the synchronous cylinder 106, 106' has a housing 113, 113' which is fixed to the chassis 108. Each steering device 107, 107' comprises a steering lever 118, 118' which connects the active piston rod 111, 111' to the pivot plate 104, 104' and is rotatably fastened at one end to the active piston rod 111, 111' and at the other end to the pivot plate 104, 104'.

The chassis 108 of the industrial truck 200 is "U-shaped" with two wheel arms 109, 109' which are interconnected by a connecting region 110. A central wheel 101 is provided, which is arranged at the connecting region 110, centrally between the wheel arms 109, 109'. Two wheels 102, 103 are also each arranged on a wheel arm 109, 109'.

Each pivot plate 104, 104' has a fastening leg 121, 121' on which the associated wheel 101, 103 is mounted so as to be rotatable about an axis of rotation R, R'. The fastening leg 121, 121' is vertical.

The steering lever 118, 118' is fastened to the pivot plate 104, 104' above the fastening leg 121, 121'.

The pivot plate 104, 104' has a steering bearing 120, 120' in each case for rotatable mounting about the steering axis L, L'.

In the case of the wheels 102, 103 arranged on the wheel arms 109, 109', the steering lever 118 is fastened to the pivot plate 104 above the fastening leg 121, between the fastening leg 121, 121' and the steering bearing 120.

In the case of the central wheel 110, the steering lever 118' is fastened to the pivot plate 104' above the fastening leg 121' and above the steering bearing 120'.

Each pivot plate 104, 104' has a steering arm A, A' to which the steering lever 118, 118' is fastened, and this steering arm A is always arranged above the fastening leg 121, 121'. In the case of the central wheel 101, the arm is arranged on the pivot plate 104, 104' above the steering bearing 120 in a rotationally fixed manner and, in the case of the wheels 102, 103 arranged on the wheel arms 109, 109', the arm is arranged on the pivot plate 4 between the fastening leg 121, 121' and the steering bearing 120 in a rotationally fixed manner.

The present invention is not limited to embodiments described herein; reference should be had to the appended claims.

LIST OF REFERENCE SIGNS

100, 200 Industrial truck
1, 101 Central wheel
1, 2, 3, 101, 102, 103 Wheels
4, 104, 104' Pivot plate
5, 105, 105' Hydraulic cylinder
6, 106, 106' Synchronous cylinder
7, 107, 107' Steering device
8, 108 Chassis
9, 9', 109, 109' Wheel arm
10, 110 Connecting region
11, 111, 111' Active piston rod
12, 112, 112' Passive piston rod
13, 113, 113' Housing
14 Piston
15 Hydraulic circuit
16 Pump
17 Tank
18, 118, 118' Steering lever
120, 120' Steering bearing
121, 121' Fastening leg
22 Steering actuation element
23 Steering unit
24, 25 Direction of rotation of steering wheel
26, 27 Hydraulic lines
28 Valve
A, A' Steering arm
F1, F2 Steering forces
L, L' Steering axis
N Longitudinal travel
Q Transverse travel
R, R' Axis of rotation
T1, T2 Steering direction

What is claimed is:

1. A steering method for an industrial truck, the industrial truck comprising:
    a pivot plate which is mounted so as to be rotatable about a steering axis in two steering directions;
    three wheels, one of the three wheels being designed as a central wheel which is rotatably mounted about an axis of rotation in the pivot plate; and
    a hydraulic cylinder which is configured to rotate the pivot plate about the steering axis,
    the method comprising:
    exerting steering forces of at least approximately equal magnitude on the pivot plate so as to provide a rotation about the steering axis in each of the two steering directions.

2. The steering method as recited in claim 1, wherein the industrial truck further comprises:
    a synchronous cylinder comprising a piston which comprises a first piston side and a second piston side, a size of each of the first piston side and the second piston side being equal, the rotation of the pivot plate being provided via the synchronous cylinder, and
    the method further comprises:
    applying a hydraulic medium of a same pressure and a same volume flow to either the first piston side or to the second piston side.

3. An industrial truck comprising:
    a pivot plate which is mounted so as to be rotatable about a steering axis in two steering directions;
    three wheels, one of the three wheels being designed as a central wheel which is rotatably mounted about an axis of rotation in the pivot plate; and
    a steering device which is configured to rotate the pivot plate about the steering axis, the steering device comprising a hydraulic circuit which comprises,
        a hydraulic cylinder which is designed as a synchronous cylinder, the synchronous cylinder comprising an active piston rod and a passive piston rod, and
        a piston comprising a first piston side and a second piston side,
        wherein,
        the hydraulic circuit is designed so that a hydraulic medium of a same pressure and a same volume flow is applied either to the first piston side or to the second piston side of the piston.

4. The industrial truck as recited in claim 3, further comprising:
    a chassis,
    wherein,
    the synchronous cylinder further comprises a housing which is fixed to the chassis, and
    the steering device further comprises a steering lever comprising a first end and a second end, the steering lever being rotatably fastened at the first end to the active piston rod and at the second end to the pivot plate so as to connect the active piston rod to the pivot plate.

5. The industrial truck as recited in claim 3, wherein the hydraulic circuit does not comprise any additional hydraulic cylinder except for the hydraulic cylinder which is designed as a synchronous cylinder.

6. An industrial truck comprising:
    a chassis;
    a pivot plate which is mounted so as to be rotatable about a steering axis, the pivot plate comprising a fastening leg;
    at least three wheels, wherein at least one of the at least three wheels is rotatably mounted about an axis of rotation in the pivot plate, and an associated wheel of the at least three wheels is rotatably mounted to the fastening leg of the pivot plate;

a steering device which is configured to rotate the pivot plate about the steering axis, the steering device comprising, a hydraulic circuit which comprises a hydraulic cylinder which is designed as a synchronous cylinder, the synchronous cylinder comprising an active piston rod, a passive piston rod, and a housing which is fixed to the chassis, and a steering lever which comprises a first end and a second end, the steering lever being rotatably fastened at the first end to the active piston rod and at the second end to the pivot plate to thereby connect the active piston rod to the pivot plate, wherein, the steering lever is fastened to the pivot plate above the fastening leg.

7. The industrial truck as recited in claim 6, wherein, the pivot plate further comprises a steering bearing which is configured to provide a rotatable mounting about the steering axis, and the steering lever is fastened to the pivot plate between the fastening leg and the steering bearing.

8. The industrial truck as recited in claim 6, wherein, the pivot plate further comprises a steering bearing which is configured to provide a rotatable mounting about the steering axis, and the steering lever is fastened to the pivot plate above the steering bearing.

* * * * *